(12) United States Patent
Shisawa et al.

(10) Patent No.: US 12,473,712 B2
(45) Date of Patent: Nov. 18, 2025

(54) CONSTRUCTION MACHINE

(71) Applicant: HITACHI CONSTRUCTION MACHINERY CO., LTD., Tokyo (JP)

(72) Inventors: Masaki Shisawa, Tsuchiura (JP); Yuuki Shirato, Tsuchiura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 457 days.

(21) Appl. No.: 18/023,471

(22) PCT Filed: Jan. 26, 2022

(86) PCT No.: PCT/JP2022/002768
§ 371 (c)(1),
(2) Date: Feb. 27, 2023

(87) PCT Pub. No.: WO2022/196115
PCT Pub. Date: Sep. 22, 2022

(65) Prior Publication Data
US 2023/0304258 A1 Sep. 28, 2023

(30) Foreign Application Priority Data
Mar. 18, 2021 (JP) ................. 2021-044371

(51) Int. Cl.
*E02F 9/00* (2006.01)
*E02F 9/08* (2006.01)

(52) U.S. Cl.
CPC .......... *E02F 9/0833* (2013.01); *E02F 9/0858* (2013.01)

(58) Field of Classification Search
CPC ............... E02F 9/0833; E02F 9/0858
(Continued)

(56) References Cited

U.S. PATENT DOCUMENTS

2010/0264687 A1   10/2010   Toyozumi et al.
2019/0389403 A1   12/2019   Yokoyama et al.
(Continued)

FOREIGN PATENT DOCUMENTS

JP    2004025974 A    1/2004
JP    2018154984 A    10/2018
(Continued)

OTHER PUBLICATIONS

Extended European Search Report received in corresponding European Application No. 22770877.3 dated Jul. 19, 2024.
(Continued)

*Primary Examiner* — Steven O Douglas
(74) *Attorney, Agent, or Firm* — MATTINGLY & MALUR, PC (57) ABSTRACT

A construction machine 1 includes: a cab 6 that includes a first frame body 15 forming an opening portion 16; a door 17 that includes a second frame body 18 attached to the first frame body 15 via hinges 19; an open state holding locking mechanism 22 that holds the door 17 in an open state; and an open state holding locking release lever 28 that releases the open state holding of the door 17 achieved by the open state holding locking mechanism 22, the first frame body 15 including a first insertion hole formed in a first side end wall 15a to which the hinges 19 are attached and a first room 31, a second frame body 18 including a second insertion hole 32 formed in a second side end wall 18a to which the hinges 19 are attached and a second room 33, the wire harness 34 being arranged from the first room 31 to the second room 33 via the first insertion hole 30 and the second insertion hole 32, the first insertion hole 30 and the second insertion hole 32 being provided on a side further upward than the open state holding locking release lever 28.

4 Claims, 6 Drawing Sheets

(58) Field of Classification Search
USPC .................................................. 296/190.08
See application file for complete search history.

(56) References Cited

U.S. PATENT DOCUMENTS

2020/0141168 A1*  5/2020  Lee ..................... E05D 11/0054
2022/0274545 A1*  9/2022  Srinivasagam ......... E02F 9/163

FOREIGN PATENT DOCUMENTS

| JP | 2019221110 A | 12/2019 |
| KR | 20180099359 A | 9/2018 |
| KR | 20180099362 A | 9/2018 |

OTHER PUBLICATIONS

International Search Report PCT/JP2022/002768 dated Apr. 19, 2022.

* cited by examiner

CONSTRUCTION MACHINE

TECHNICAL FIELD

The present invention relates to a construction machine and particularly to a construction machine with a wire harness arranged inside a door provided in a cab.

BACKGROUND ART

Patent Document 1 discloses a door structure with a wire harness arranged in a vehicle body of a vehicle from the inside of a door through an insertion hole opened in a side end wall of the door. The wire harness supplies power to electrical equipment mounted on the door of the vehicle.

An improvement in convenience when an operator gets on and off a cab is required for a construction machine. As an example of an improvement in convenience, electrical equipment such as a key switch that enables electronic locking of a cab door is installed in the door. A wire harness is arranged inside the door from the side of the main body of the cab. Power is supplied to the electrical equipment by the wire harness being connected to the electrical equipment.

As another example of an improvement in convenience, a door structure in which a frame body of a door provided at a cab of a construction machine is attached to a frame body of the cab via a hinge and the door can be opened by 180° around the hinge from a state where the door is closed (closed state) is adopted. An outer side surface of the door in a state where it is opened by 180° can be held on an outer side surface of the cab by an open state holding locking mechanism. It is possible for an operator to release locking by the open state holding locking mechanism and brings the door into a closed state by operating an open state holding locking release lever.

The open state holding locking release lever is provided in the vicinity of an opening of the cab covered with the door in consideration of operability in many cases. On the other hand, an insertion hole for the wire harness is opened in each of a side end wall to which a hinge of the frame body of the door is attached and a side end wall to which a hinge of the frame body of the cab is attached. The wire harness is arranged inside the door from the side of the main body of the cab via each of the insertion holes in the cab and the door.

PRIOR ART DOCUMENT

Patent Document

Patent Document 1: Japanese Patent Laid-Open No. 2004-25974

SUMMARY OF THE INVENTION

Problems to be Solved by the Invention

When an operator outside the cab operates the open state holding locking release lever, the operator operates the open state holding locking release lever from the lower side since the cab is located above the traveling body of the construction machine. Also, when the door is in a 180° open state, the wire harness is exposed to the outside between the insertion hole of the door and the insertion hole of the cab for insertion of the wire harness. Therefore, in a case where the open state holding locking release lever is located at on the side further downward than each insertion hole, it is necessary for the operator to operate the locking release lever while avoiding the wire harness that is exposed between the insertion holes and may hang down therefrom in some cases when the operator operates the open state holding locking release lever.

Therefore, operability of the open state holding locking release lever and thus convenience of the operator are degraded, and a risk that the operator may come into contact with the wire harness increases in the related art. Specifically, there is a concern that the operator who is about to operate the open state holding locking release lever may accidentally grab the wire harness and fall down or that the wire harness is disconnected.

The present invention was made in view of such problems, and an object thereof is to provide a construction machine capable of reducing a risk that an operator may come into contact with a wire harness while securing convenience of the operator.

Means for Solving the Problems

In order to achieve the above object, a construction machine according to the present invention includes: a cab that has a first frame body forming an opening portion; a door that has a second frame body attached to the first frame body via hinges and covers the opening portion in a closed state; an open state holding locking mechanism that includes a first engagement portion formed in an outer side surface of the cab and a second engagement portion formed in an outer side surface of the door and holds the door in an open state by causing the second engagement portion to be engaged with the first engagement portion when the door is opened; and an open state holding locking release lever that is provided in the vicinity of the opening portion of the cab and releases the engagement between the first engagement portion and the second engagement portion thereby to release open state holding of the door achieved by the open state holding locking mechanism, the first frame body including a first insertion hole formed in a first side end wall to which the hinges are attached and a first room, the second frame body including a second insertion hole formed in a second side end wall to which the hinges are attached and a second room, a wire harness being arranged from the first room to the second room via the first insertion hole and the second insertion hole, the first insertion hole and the second insertion hole being provided on a side further upward than the open state holding locking release lever.

Advantageous Effects of the Invention

According to the construction machine of the present invention, it is possible to reduce a risk that an operator may come into contact with a wire harness while securing convenience of the operator.

MODE FOR CARRYING OUT THE INVENTION

Hereinafter, a construction machine according to each embodiment of the present invention will be described with reference to the drawings.

Figure 1:
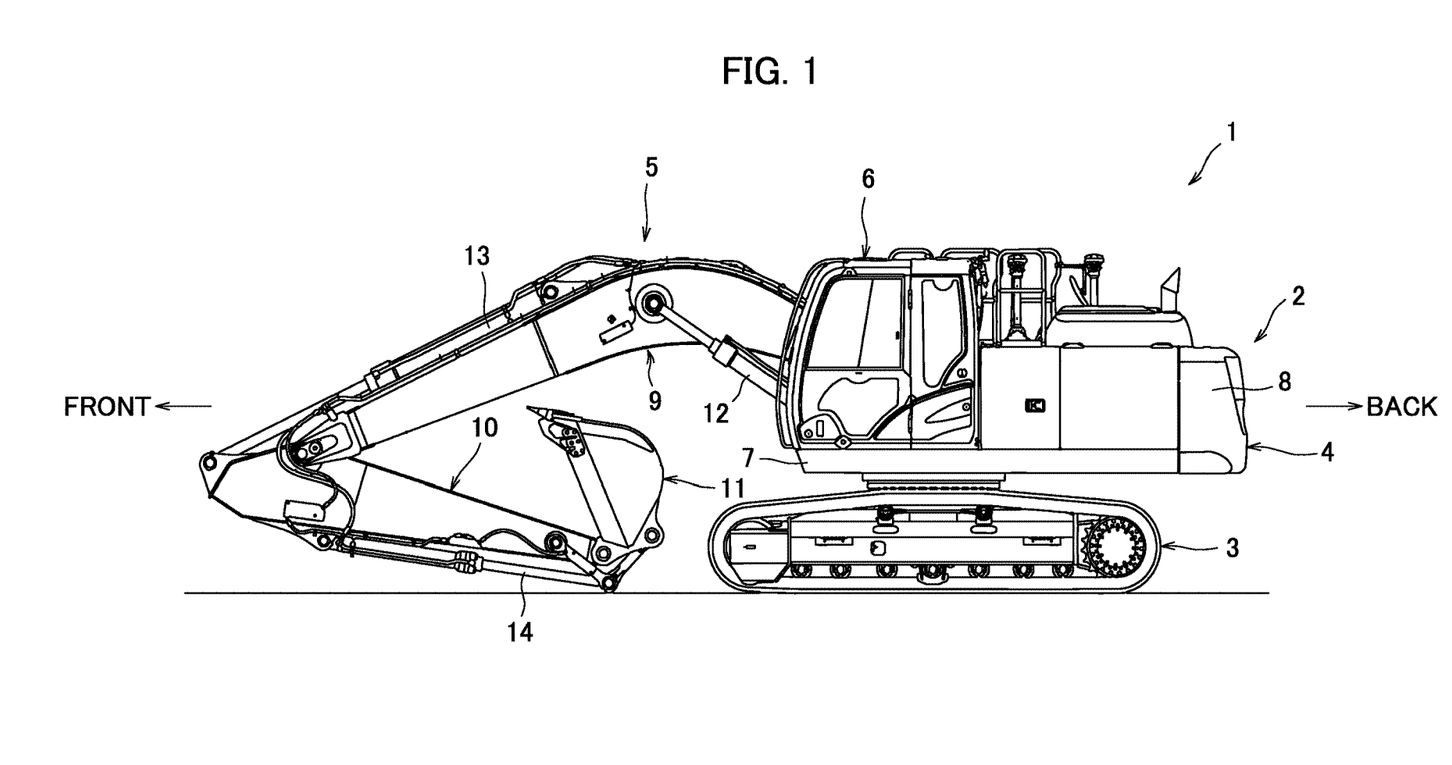
FIG. 1 is a side view of a hydraulic excavator illustrated as an example of a construction machine according to an embodiment of the present invention.

FIG. 1 is a side view of a hydraulic excavator 1 as an example of the construction machine. A vehicle body 2 of the hydraulic excavator 1 is configured of a self-propelled lower traveling body 3 of a crawler type and an upper revolving body 4 mounted on the lower traveling body 3 such that it can revolve. An operation device 5 of a swing type for performing a soil excavation operation or the like is attached to a front portion of the upper revolving body 4. Note that the front-back direction of the vehicle body 2 is illustrated by an arrow in each drawing.

The upper revolving body 4 is configured such that it can revolve within a vehicle width of the lower traveling body 3, and a cab 6 on which an operator gets is installed at a front portion of the upper revolving body 4. A counterweight 8 and a hydraulic pump and the like which are not illustrated are supported by a revolving frame 7 of the upper revolving body 4. The operation device 5 is attached to a front portion of the revolving frame 7 and is configured to be able to swing on the left and right sides in response to revolution of the upper revolving body 4 and face up and down.

The operation device 5 includes a boom 9, an arm 10, and a bucket 11 in order from the side of the cab 6. The boom 9 is attached to the revolving frame 7 with a boom cylinder 12 such that the boom 9 can face up and down. The arm 10 is turnably attached to the boom 9 with an arm cylinder 13. The bucket 11 is turnably attached to the arm with a bucket cylinder 14.

Figure 2:
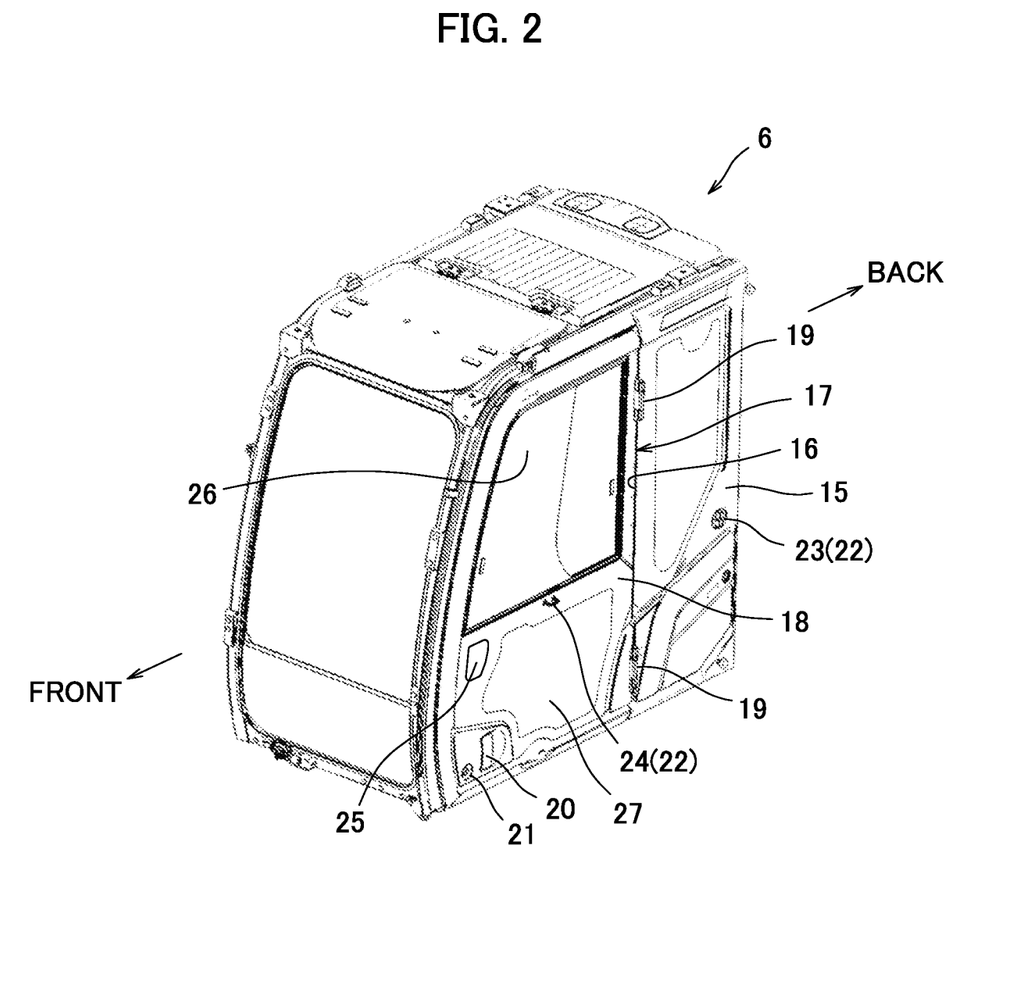
FIG. 2 is a perspective view of a cab seen from an upper side.
Figure 3:
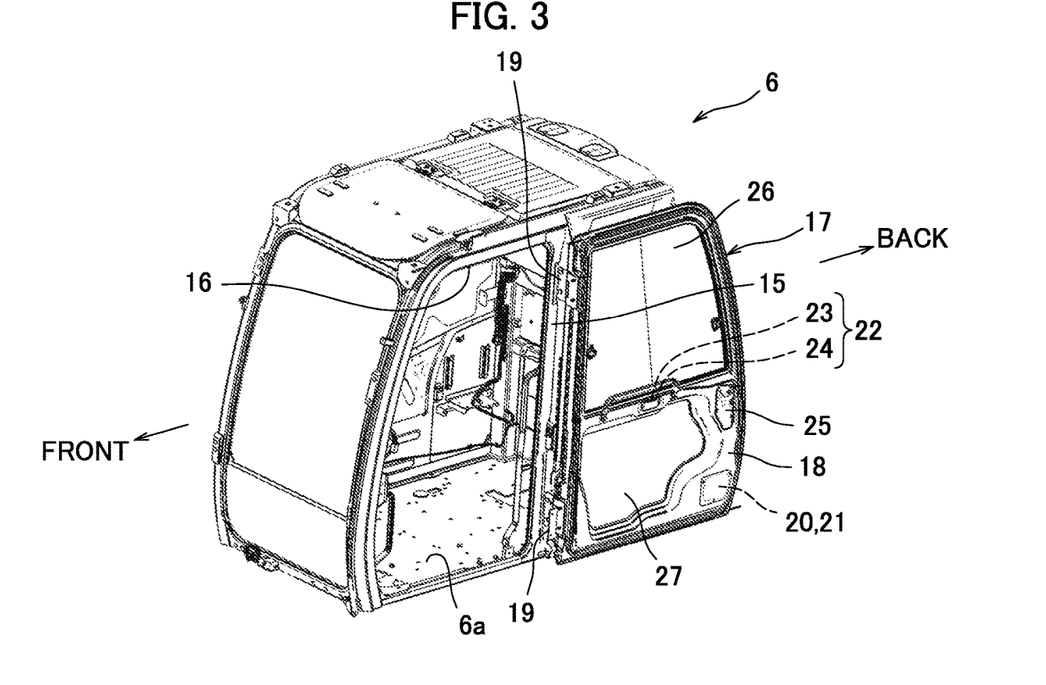
FIG. 3 is a perspective view of the cab when a door is opened.

FIG. 2 illustrates a perspective view of the cab 6 seen from the upper side. FIG. 3 is a perspective view of the cab 6 when the door is opened. The cab 6 includes a first frame body 15 at a side portion, and an opening portion 16 is formed in the first frame body 15. The cab 6 is provided with a door 17 including a second frame body 18. The door 17 covers the opening portion 16 in a closed state, and the second frame body 18 of the door 17 is attached to the first frame body 15 of the cab 6 via hinges 19 disposed at two locations on upper and lower sides.

As illustrated in FIG. 3, the door 17 can be opened by about 180° from a closed state around each hinge 19. A handle 20 for performing opening and closing operations on the door 17 is provided at a front portion of the door 17 on the lower side, and the handle 20 also functions as a door locking release lever for releasing locking of the door 17 in the closed state. A key switch 21 that is an example of electrical equipment is provided on the front side of the handle 20. The key switch 21 enables electronic locking and electronic locking release of the door 17 in the closed state.

The cab 6 is provided with an open state holding locking mechanism 22 for holding the door 17 in an about 180° open state. The open state holding locking mechanism 22 includes a first engagement portion 23 that is formed on the outer side surface of the cab 6 in the first frame body and a second engagement portion 24 that is formed on the outer side surface of the door 17 in the second frame body 18. The door 17 is held in the about 180° open state by causing the second engagement portion 24 to be engaged with the first engagement portion 23 when the door 17 is opened by 180°.

The door 17 includes a maintenance window 24 that is provided above the handle 20 and the key switch 21, an upper window 26 that is provided above the maintenance window 25, and a lower window 27 that is provided below the upper window 26. The maintenance window 25 is a small window that is provided at a front portion of the door 17 and can be opened, and the maintenance window 25 is opened and thereby allows accesses to the second room 33 formed in the second frame body 18 of the door 17 as will be described later. The upper window 26 and the lower window 27 are used to secure visibility of the operator during operation of the hydraulic excavator 1.

Figure 4:
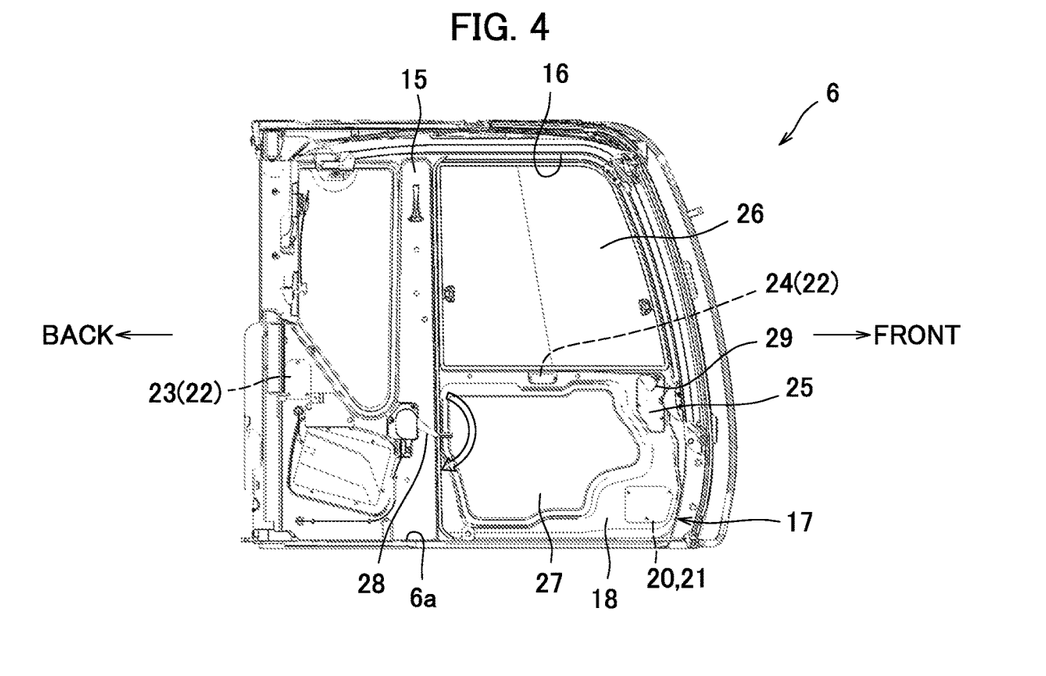
FIG. 4 is a side view of the door and a first frame body of the cab seen from the inside of the cab when the door is in a closed state.

FIG. 4 illustrates a side view of the door 17 and the first frame body 15 of the cab 6 seen from the inside of the cab 6 when the door 17 is in the closed state. An open state holding locking release lever 28 is provided in the vicinity of the opening portion 16 of the first frame body 15 of the cab 6 and above a floor 6a of the cab 6. The engagement between the first engagement portion 23 and the second engagement portion 24 is released by causing the opening state holding locking release lever 28 to turn in the arc arrow direction illustrated in FIG. 4, and the open state holding of the door 17 achieved by the open state holding locking mechanism 22 is released. An in-cab door locking release lever 29 is provided at the position of the maintenance window 25 in the door 17. It is possible to release the locking of the door 17 in the closed state from the inside of the cab 6 by operating the in-cab door locking release lever 29.

Figure 5:
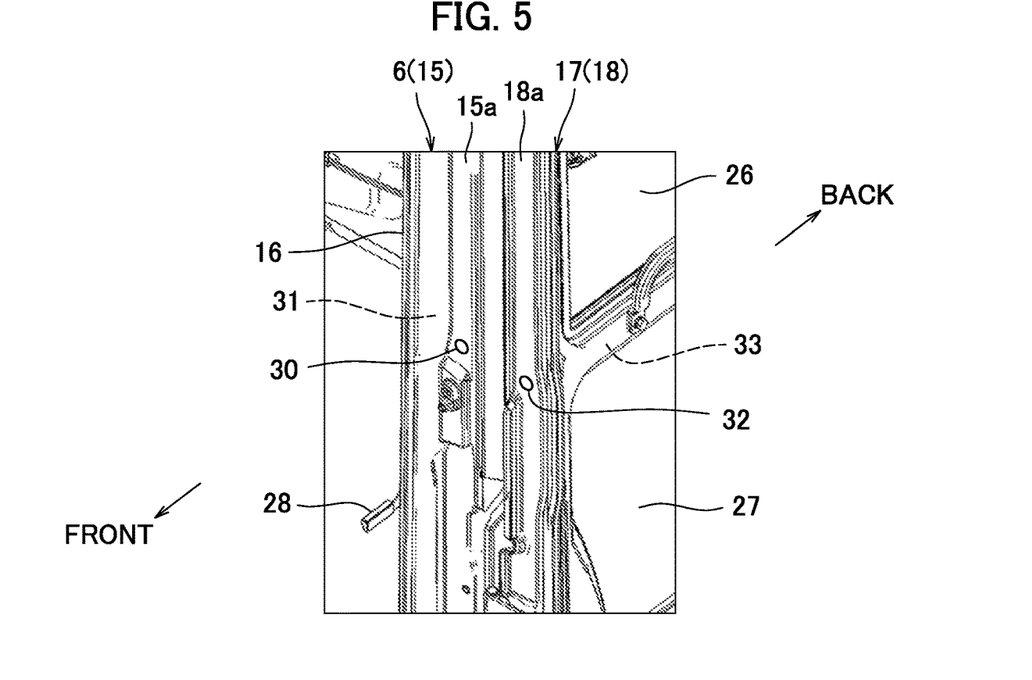
FIG. 5 is a perspective view partially illustrating the first from body of the cab and a second frame body of the door in the vicinity of an open state holding release lever when the door is opened.

FIG. 5 partially illustrates, by a perspective view, the first frame body 15 of the cab 6 and the second frame body 18 of the door 17 in the vicinity of the open state holding locking release lever 28 when the door 17 is opened. A first insertion hole 30 that is formed on the side of the hinges 19 and a first room 31 that communicates with the inside of the first frame body 15 from the first insertion hole 30 are formed in the first frame body 15 of the cab 6. A second insertion hole 32 that is formed on the side of the hinges 19 and a second room 33 that communicates with the inside of the second frame body 18 from the second insertion hole 32 are formed in the second frame body 18 of the door 17.

Specifically, the first insertion hole 30 is formed in the first side end wall 15a of the first frame body 15 of the cab 6, to which the hinges 19 is attached. The second insertion hole 32 is formed in the second side end wall 18a in the second frame body 18 of the door 17, to which the hinges 19 are attached. When the door 17 is brought into the closed state, the first side end wall 15a and the second side end wall 18a face each other. With this, the first insertion hole 30 and the second insertion hole 32 face each other. The first insertion hole 30 and the second insertion hole 32 are provided on the side further upward than the open state holding locking release lever 28.

Figure 6:
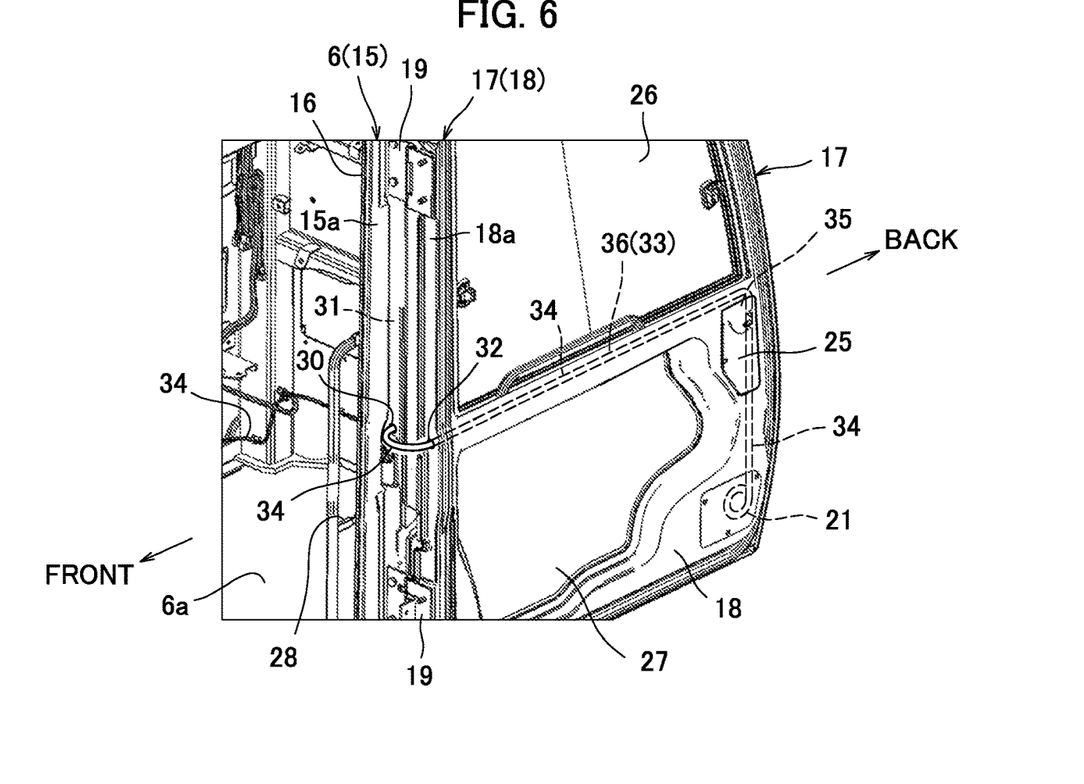
FIG. 6 is a perspective view illustrating a wire harness route arranged in a second room inside the door from the inside of the cab.
Figure 7:
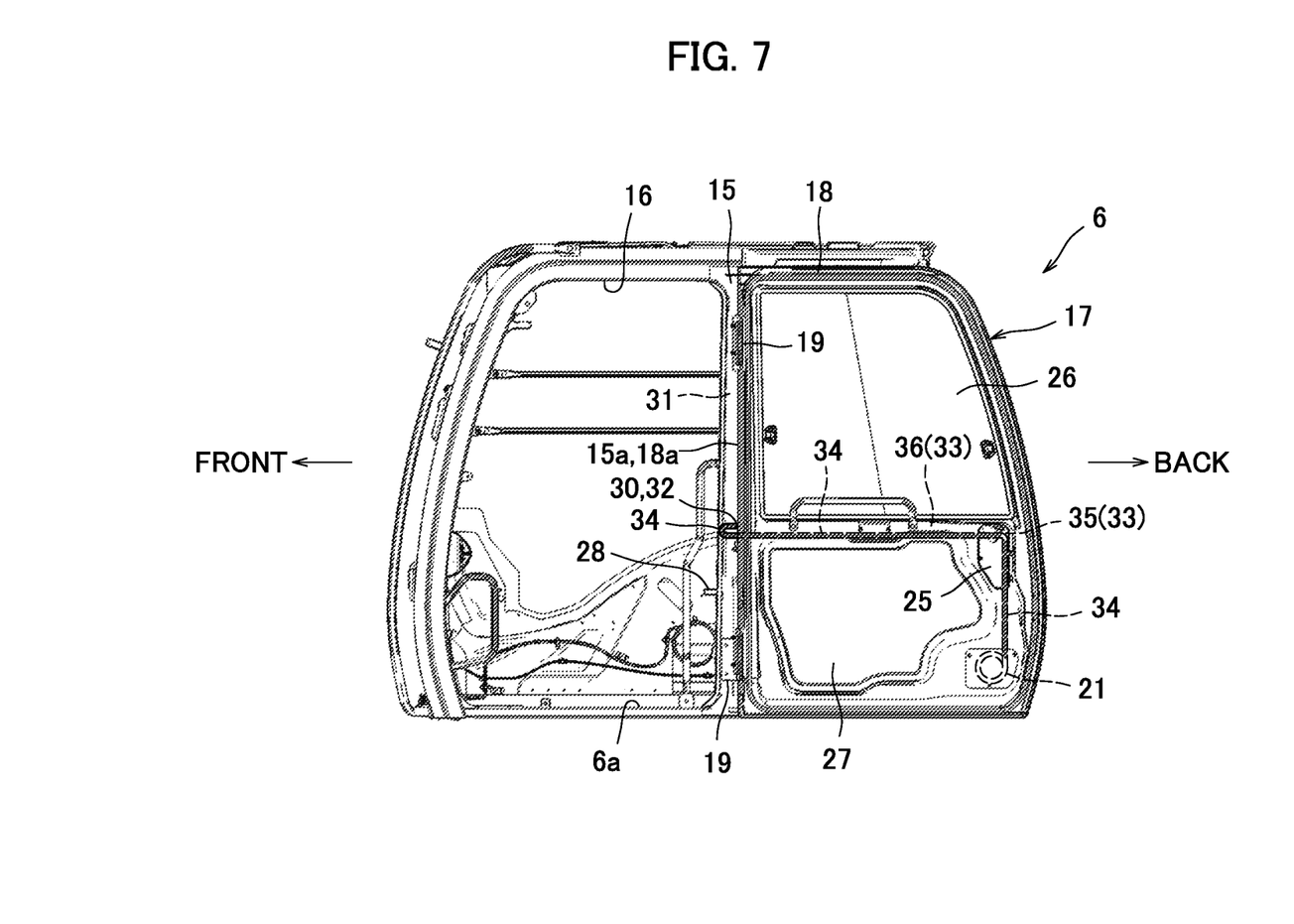
FIG. 7 is a side view illustrating the wire harness route arranged in the second room inside the door from the inside of the cab.

FIG. 6 is a perspective view illustrating a wire harness route arranged in the second room 33 inside the door 17 from the inside of the cab 6. FIG. 7 is a side view illustrating a wire harness route arranged in the second room 33 inside the door 17 from the inside of the cab 6. FIG. 6 and FIG. 7 illustrate a state where the door 17 is opened. A wire harness 34 is arranged from a power supply source that is mounted in the cab 6 and is not illustrated in the drawing toward the door 17, and the wire harness 34 supplies power to the key switch 21.

The wire harness 34 is arranged in the vicinity of the floor 6*a* inside the cab 6, is then arranged in the first room 31 of the cab 6, is inserted into the first insertion hole 30, is exposed once from the first room 31, is inserted into the second insertion hole 32, and is then arranged in the second room 33 of the door 17. In other words, the wire harness 34 is arranged from the first room 31 of the cab 6 to the second room 33 of the door 17 via the first insertion hole 30 and the second insertion hole 32 provided on the side further upward than the open state holding locking release lever 28.

In a case where the operator operates the open state holding locking release lever 28 in a state where the door 17 is opened by about 180°, the operator operates the open state holding locking release lever 28 from the outside of the cab 6 in a state where the operator is standing on the ground or in a state where the operator is seated in the seat of the cab 6. In this case, the risk that the operator may come into contact with the wire harness 34 exposed to the outside between the first insertion hole 30 and the second insertion hole 32 is reduced by the first insertion hole 30 and the second insertion hole 32 being provided on the side further upward than the open state holding locking release lever 28.

A first arrangement space 35 is formed in the second room 33 of the door 17 in the vicinity of the maintenance window 25. The wire harness 34 is inserted from the second insertion hole 32 of the door 17, then passes through the first arrangement space 35, is bent below, and is connected to the key switch 21. The wire harness 34 is inserted from the second insertion hole 32 of the door 17, then passes the vicinity of the maintenance window 25 in the first arrangement space 35, is bent below, and is connected to the key switch 21. It is possible to facilitate an operation of bending the wire harness 34 below toward the key switch 21 by opening the maintenance window 25 and accessing the first arrangement space 35 when the wire harness 34 is arranged in the second room 33.

A second arrangement space 36 is provided in the second room 33 of the door 17 between the upper window 26 and the lower window 27. The wire harness 34 is inserted from the second insertion hole 32 of the door 17, then passes the second arrangement space 36 and the first arrangement space 35, is bent below, and is connected to the key switch 21.

Figure 8:
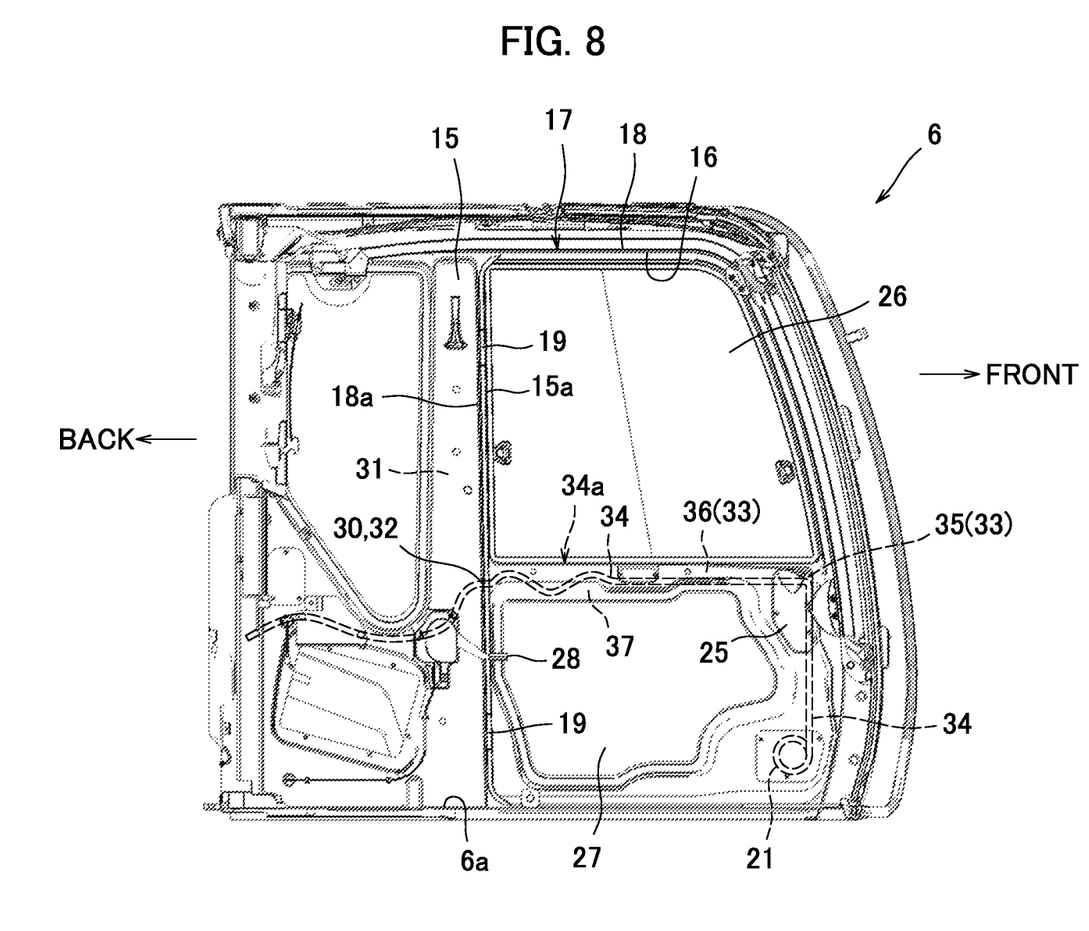
FIG. 8 is a side view illustrating the wire harness route seen from the inside of the cab when the door is in a closed state.

FIG. 8 is a side view illustrating a wire harness route seen from the inside of the cab 6 when the door 17 is in the closed state. The second arrangement space 36 formed in the second room 33 of the door 17 also functions as an excess length accommodating portion 37 in which an excess length of the wire harness 34 generated when the door 17 is shifted from the open state to the closed state is accommodated. When the door 17 is in the closed state, an excess length portion 34*a* of the wire harness 34 is accommodated in a folded manner in the second arrangement space 36 as the excess length accommodating portion 37, such that the excess length of the wire harness 34 does not stick out to the inside of the cab 6.

As described above, the first insertion hole 30 and the second insertion hole 32 into which the wire harness 34 is inserted are provided on the side further upward than the open state holding locking release lever 28 in the hydraulic excavator 1 according to the present embodiment. In this manner, the risk that the operator may come into contact with the wire harness 34 exposed to the outside between the first insertion hole 30 and the second insertion hole 32 is reduced while operability of the open state holding locking release lever 28 and thus convenience of the operator are secured. Specifically, the concern that the operator who is about to operate the open state holding locking release lever 28 may accidentally grab the wire harness 34 and fall down or that the wire harness 34 is disconnected is reduced.

Also, it is possible to facilitate an operation of bending the wire harness 34 toward the key switch 21 if the maintenance window 25 is opened when the wire harness 34 is arranged in the second room 33 by the first arrangement space 35 being formed in the second room 33 of the door 17.

Also, it is possible to use the second arrangement space 36 formed between the upper window 26 and the lower window 27 in the second room 33 as a wire harness route by the second arrangement space 36 being formed in the second room 33 of the door 17. It is thus possible to effectively use the limited space in the second room 33.

Additionally, the second arrangement space 36 formed in the second room 33 of the door 17 also functions as the excess length accommodating portion 37 in which the excess length of the wire harness 34 is accommodated. In this manner, visibility and habitability inside the cab 6 are not degraded due to the excess length of the wire harness 34 sticking out to the inside of the cab 6 when the door 17 is in the closed state.

Although the embodiment of the present invention will end here, the present invention is not limited to the above embodiment and can be modified in various manners without departing from the gist of the present invention.

For example, the wire harness route formed in the second room 33 of the door 17 is not limited to the illustrated mode as long as the first arrangement space 35 and the second arrangement space 36 are formed. Also, the configurations in the above embodiment which do not depart from the gist of the present invention can also be applied not only to the hydraulic excavator 1 but also to construction machines including various operation devices other than the operation device 5.

EXPLANATION OF REFERENCE SIGNS

1 Hydraulic excavator (construction machine)
6 Cab
15 First frame body
15*a* First side end wall
16 Opening portion
17 Door
18 Second frame body
18*a* Second side end wall
19 Hinge
21 Key switch (electrical equipment)
22 Open state holding locking mechanism
23 First engagement portion
24 Second engagement portion
25 Maintenance window
26 Upper window
27 Lower window
28 Open state holding locking release lever
First insertion hole
31 First room
32 Second insertion hole
33 Second room
35 First arrangement space 36 Second arrangement space
37 Excess length accommodating portion

The invention claimed is:

1. A construction machine comprising:
a cab that has a first frame body forming an opening portion;
a door that has a second frame body attached to the first frame body via a hinge and covers the opening portion in a closed state;
an open state holding locking mechanism that includes a first engagement portion formed in an outer side surface of the cab and a second engagement portion formed in an outer side surface of the door and holds the door in an open state by causing the second engagement portion to be engaged with the first engagement portion when the door is opened; and
an open state holding locking release lever that is provided in the vicinity of the opening portion of the cab and releases the engagement between the first engagement portion and the second engagement portion thereby to release open state holding of the door achieved by the open state holding locking mechanism,
wherein the first frame body includes a first insertion hole formed in a first side end wall to which the hinge is attached and a first room,
the second frame body includes a second insertion hole formed in a second side end wall to which the hinge is attached and a second room,
a wire harness is arranged from the first room to the second room via the first insertion hole and the second insertion hole, and
the first insertion hole and the second insertion hole are provided on a side further upward than the open state holding locking release lever.

2. The construction machine according to claim 1,
wherein the door includes electrical equipment and a maintenance window provided above the electrical equipment,
a first arrangement space is formed in the vicinity of the maintenance window in the second room of the door, and
the wire harness is inserted from the second insertion hole of the door, then passes the vicinity of the maintenance window in the first arrangement space, and is connected to the electrical equipment.

3. The construction machine according to claim 2,
wherein the door includes an upper window provided above the maintenance window and a lower window provided below the upper window,
a second arrangement space is formed between the upper window and the lower window in the second room of the door, and
the wire harness is inserted from the second insertion hole of the door, then passes the second arrangement space and the first arrangement space, and is connected to the electrical equipment.

4. The construction machine according to claim 3, wherein the second arrangement space formed in the second room of the door is an excess length accommodating portion in which an excess length of the wire harness generated when the door is shifted from an open state to a closed state is accommodated.

* * * * *